(12) United States Patent
Oprea et al.

(10) Patent No.: US 6,595,182 B2
(45) Date of Patent: Jul. 22, 2003

(54) DIRECT FUEL INJECTION AND IGNITION SYSTEM FOR INTERNAL COMBUSTION ENGINES

(76) Inventors: Radu Oprea, 22711 20th Dr. SE., Apt. H204, Bothell, WA (US) 98021; Edward Rakosi, Str. Buna Vestire Nr. 18, Iasi 6600 (RO)

(*) Notice: Subject to any disclaimer, the term of this patent is extended or adjusted under 35 U.S.C. 154(b) by 96 days.

(21) Appl. No.: 09/874,548

(22) Filed: Jun. 4, 2001

(65) Prior Publication Data

US 2001/0050069 A1 Dec. 13, 2001

Related U.S. Application Data

(60) Provisional application No. 60/210,085, filed on Jun. 7, 2000.

(51) Int. Cl.$^7$ ............................................... F02M 57/06
(52) U.S. Cl. ..................... 123/297; 123/295; 123/299
(58) Field of Search .................... 123/297, 275, 123/295, 305, 259, 260, 299, 435

(56) References Cited

U.S. PATENT DOCUMENTS 3,933,134 A * 1/1976 Yagi et al. .................. 123/259
5,222,481 A * 6/1993 Morikawa .................. 123/435
5,293,851 A * 3/1994 Schaub ...................... 123/259
5,555,868 A * 9/1996 Neumam .................... 123/275

* cited by examiner

Primary Examiner—Mahmoud Gimie

(57) ABSTRACT

An injection and ignition device is disclosed, for preparing, injecting and igniting a stratified air-fuel charge inside the cylinder of an internal combustion engine.

The device comprises and injection valve, ignition means and a combustion shell surrounding the injection valve and ignition means. The combustion shell has a plurality of flame nozzles cut through its walls.

The injection valve divides the total amount of fuel injected per cycle into a main dose and a pilot dose. The main dose is injected into the combustion chamber, forming a lean mixture therein. The smaller pilot dose is injected inside the combustion shell, forming a rich moisture therein.

The ignition means easily ignite this rich mixture. As the fuel burs inside the combustion shell, the pressure therein will rise and the combustion flames will be ejected through the flame nozzles into the combustion chamber. Thus torch ignition of the lean mixture field occurs.

2 Claims, 3 Drawing Sheets

DIRECT FUEL INJECTION AND IGNITION SYSTEM FOR INTERNAL COMBUSTION ENGINES

This application claims benefit under 37 CFR 119e to the provisional application 60/210,085

CROSS REFERENCE TO RELATED APPLICATIONS

Not Applicable.

Statement Regarding Federally Sponsored Research or Development

Not Applicable.

Reference to Microfiche Appendix

Not Applicable.

BACKGROUND OF THE INVENTION

This invention relates to fuel systems for internal combustion engines and more particularly to stratified charge and torch ignition engines.

Direct injection, combined with stratified charge and torch ignition is an effective means for simultaneously reducing emissions and fuel consumption in spark ignition engines. In most prior art concepts, air-fuel mixture stratification is obtained by physically dividing the combustion chamber into a main chamber and an ignition chamber. The two distinct chambers are fluidically connected by means of one or more torch nozzles. A lean mixture, generally prepared outside the cylinder, is supplied to the main chamber. A small amount of fuel is injected directly into the ignition chamber, thus forming a rich mixture therein. This rich, easily ignitable mixture is then ignited, in the ignition chamber, and the resulting flame is ejected through the torch nozzles, thereby igniting the lean mixture from the main combustion chamber.

The most recent designs achieve mixture stratification utilizing only direct fuel injection and controlled fluid movement inside the cylinder. Inducing and controlling the fluid motion is sometimes accomplished entirely inside the cylinder, using special piston and combustion chamber shapes. Alternatively, the motion is initiated externally, by means of specifically profiled induction profiles and then it is maintained and controlled in the cylinder. A separate spark plug is necessary to initiate combustion.

Some disadvantages of the prior art designs are:

Complicated combustion chamber and intake duct design;

The engine must be specifically designed to operate as a stratified charge engine, requiring special piston and cylinder head shapes;

Most designs use two separate fuel systems to achieve charge stratification;

Most designs use a separate spark plug to ignite the fuel, thereby making the implementation of this method to the modern, multi-valve engines, a challenging task.

BRIEF SUMMARY OF THE INVENTION

The device of the invention overcomes the aforementioned disadvantages of the prior art by utilizing a single injection and ignition device to supply the fuel, form the stratified charge and ignite the fuel. The injection device effectively divides a predetermined fuel dose into a main dose and a substantially lesser pilot dose. The main and the pilot dose are injected during the compression stroke of the engine. The variable cylinder pressure during the compression stroke is used as a means to control fuel flow rate and fuel jet penetration into the combustion chamber.

The pressure rise inside the engine during the compression stroke co-operates with the device geometry to ensure the formation and optimum spatial placement of a rich mixture kernel, and to control the formation and spatial distribution of a lean mixture field.

At a predetermined time, an integrated ignition source provides an electric spark, which ignites the rich mixture. The subsequent combustion flames propagate through the lean mixture field, thereby promoting the torch ignition of the fuel thereof.

Objects and advantages.

Accordingly, several objects and advantages of the invention are:

The compact injection and ignition device of the invention can be easily installed on modern multi-valve engines;

Instead of relying on combustion chamber geometry to form and control charge stratification, the device of the invention utilizes its own geometry, in co-operation with the variable cylinder pressure instead. Therefore the injection and ignition device of the invention can be installed on a variety of existing engines, requiring only small constructive changes.

The injection and ignition device of the invention can be used for fueling an engine with a traditional liquid fuel, such as gasoline, or with a gaseous fuel, whereby the device can be used to convert a Diesel engine to operation on a gaseous fuel, with only minimal constructive modifications of the pistons or cylinder head.

The injection and ignition device of the invention permits the modified spark ignition engine to run on an overall leaner mixture than a traditional, homogenous charge, spark ignition engine, with superior efficiency, approaching the Diesel cycle.

List of Reference Numerals

1 Fuel Inlet
2 Fuel Passage
3 Fuel Port
4 Body
5 Solenoid
6 Nozzle
7 Electrical insulator
8 First Electrode
9 Valve Seat
10 Fuel Discharge Cavity
11 Combustion Shell
12 Combustion Chamber
13 Second Electrode 14 Torch nozzle
15 Pilot Injection Port
16 Main Injection Port
17 Valve
17A Valve Stem
17B Locating Collar
18 Fuel Passage Groove
19 Stroke Limiter
20 First Spring Retainer
21 Return Spring
22 Second Spring Retainer
23 Armature
24 Electrical connector
25 Electrical terminals

DETAILED DESCRIPTION OF THE INVENTION

Figure 1:
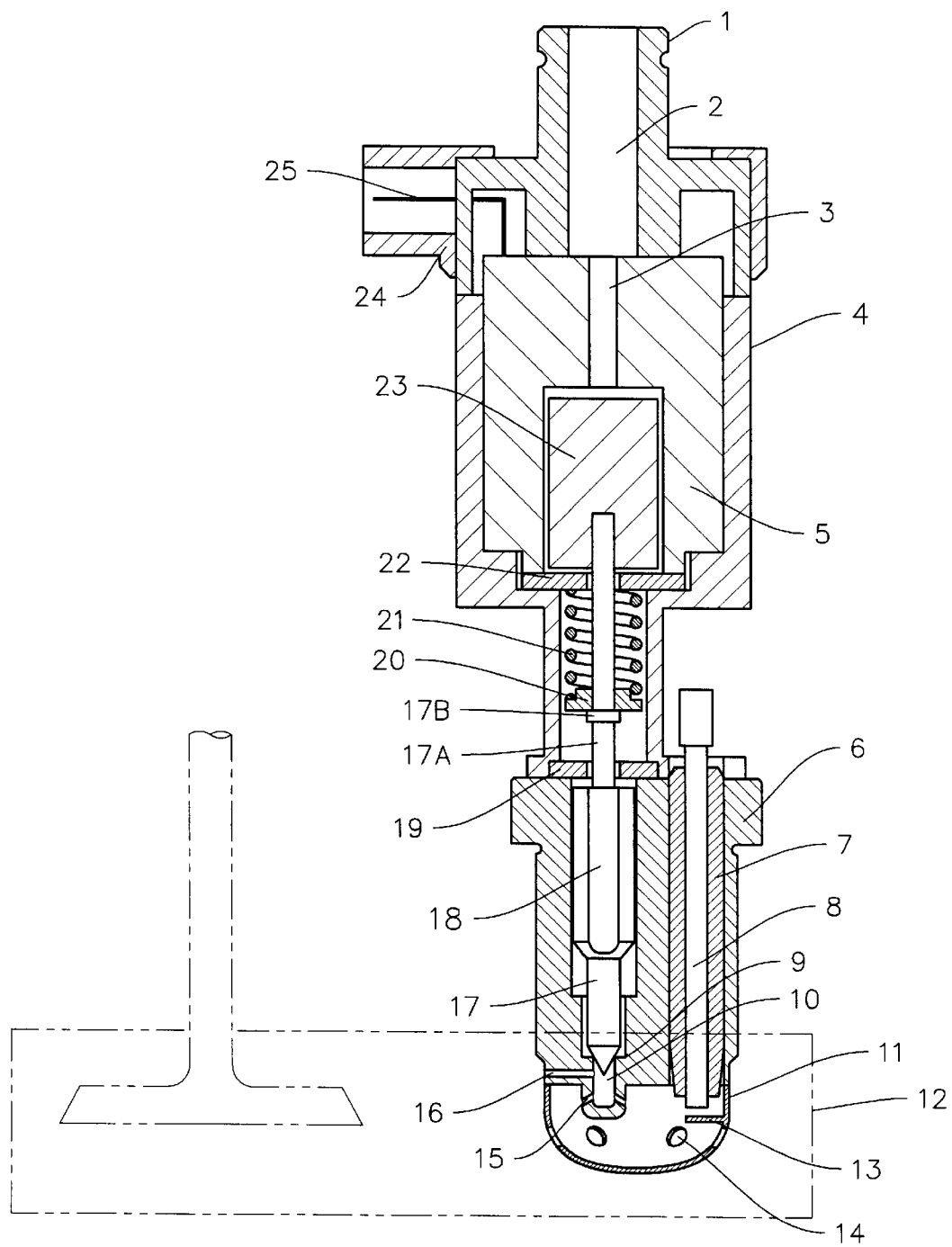
FIG. 1 illustrates a preferred embodiment of the injection and ignition device, according to the invention.

FIG. 1 illustrates a preferred embodiment of the injection and ignition device of the invention. The device has a fuel inlet 1, fluidically connectable to an external source of fuel. At least one fuel passage 2 is machined through the fuel inlet. The fuel passage permits fluid communication between the fuel inlet and a fuel port 3.

Fuel inlet 1 is fixedly mounted to a body 4. Means are provided to ensure a fluid tight seal between fuel inlet 1 and body 4. Also fixedly mounted inside body 4 are a solenoid 5, and a nozzle 6. An electrical insulator 7 and a first electrode 8 are fixedly mounted in nozzle 6.

In the preferred embodiment of the injection and ignition device of the invention, the first electrode is electrically connected to a positive terminal of an interruptible high voltage source, such as an ignition coil.

Means are provided to ensure fluid tight seals between body 4 and nozzle 6, between electrical insulator 7 and nozzle 6, and between first electrode 8 and electrical insulator 7.

Nozzle 6 comprises a valve seat 9 and a fuel discharge cavity 10.

Fixedly mounted to nozzle 6 is a combustion shell 11. Combustion shell 11 protrudes into an internal combustion engine combustion chamber 12. A second electrode 13 is fixedly mounted to the combustion shell. In the preferred embodiment of the injection and ignition device, the second electrode is connected to a negative terminal of said external high voltage source.

The combustion shell has at least one torch nozzle 14, machined therethrough. In the preferred embodiment, there is a plurality of torch nozzles, arranged in a predetermined pattern, the geometry of which depends on the combustion chamber architecture.

Fuel discharge cavity 10 fluidically communicates with the space delimited by combustion shell 11 by means of at least one pilot injection port 15. Fuel discharge cavity 10 is also fluidically connected to the engine combustion chamber by means of at least one main injection port 16. In the preferred embodiment, there is a plurality of main injection ports and a plurality of pilot injection ports, arranged in predetermined patterns, the geometry of which depends on the combustion chamber architecture. The total area of the main injection ports is substantially larger than the total area of the pilot injection ports.

Slidably mounted in nozzle 6 is an injection valve 17. The valve has at least one fuel passage groove 18 cut thereunto.

In its preferred embodiment, the injection valve has a plurality of equidistantly spaced fuel passage grooves. In the absence of the fuel passage grooves, others embodiments may use at least one internal fuel passage machined through the valve. Injection valve 17 has an elongated cylindrical stem 17A, fixedly and permanently attached thereunto.

Fixedly mounted between body 4 and nozzle 6 is a stroke limiter 19. A first spring retainer 20 is mounted on the valve stem.

In the preferred embodiment, spring retainer 20 is slidably mounted on the valve stem and is axially located on stem 17A by a collar 17B.

In its neutral, non-activated position, injection valve 17 is resiliently urged against valve seat 9 by a return spring 21, thus providing a fluid tight seal between the valve and the seat. Return spring 21 abuts against, and is pre-compressed by, a second spring retainer 22. Second spring retainer 22 is fixedly mounted between body 4 and solenoid 5.

Fixedly attached to valve stem 17A is an armature 23, which projects into solenoid 5.

An electrical connector 24 is fixedly attached to fuel inlet 1. Inside the connector are a plurality of electrical terminals 25, electrically connected to solenoid 5.

Operation

Figure 2:
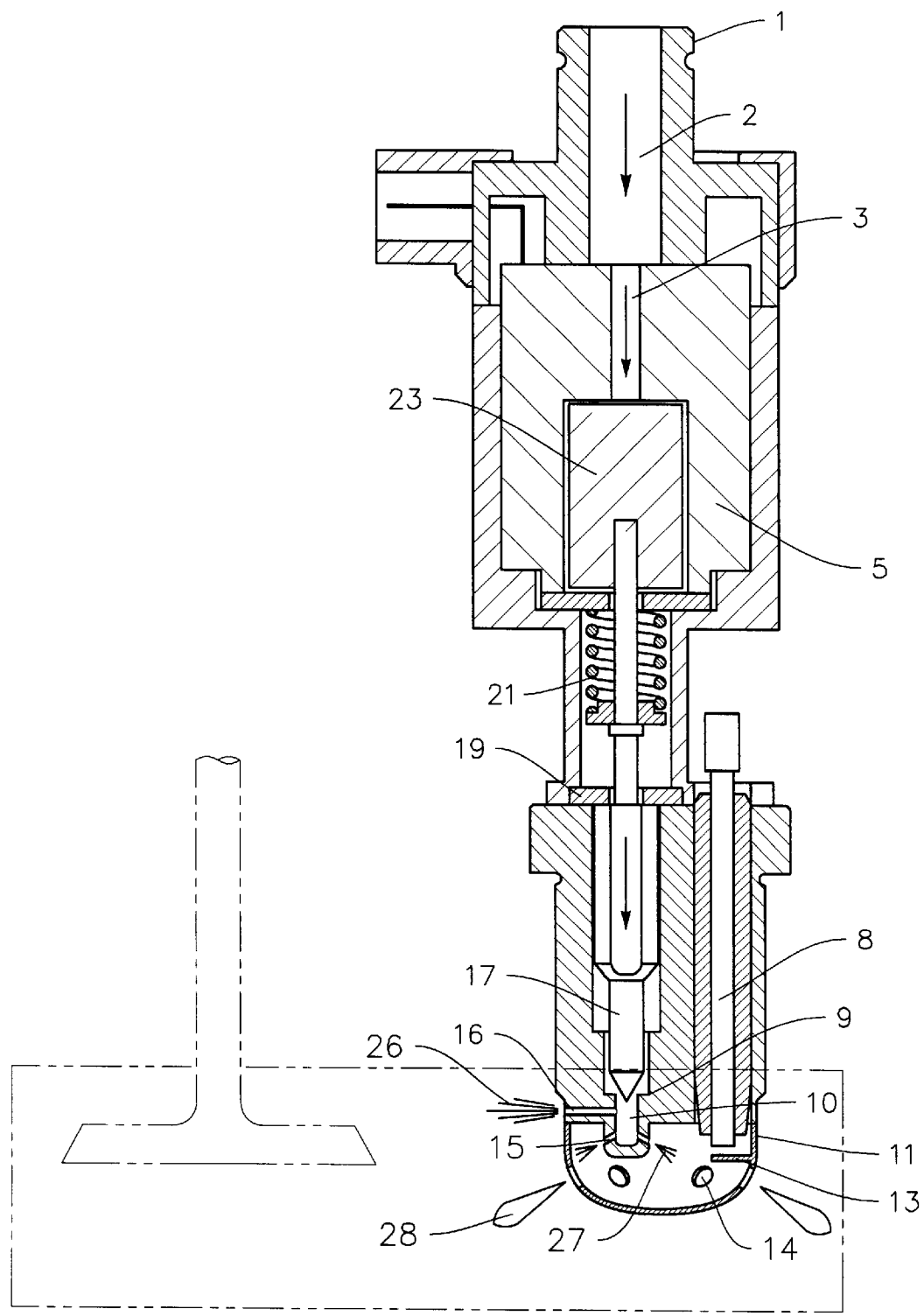
FIG. 2 reveals the operation of the injection and ignition device of the invention.

Referring now to FIG. 2, the use of the injection and ignition device of the invention is illustrated. A fuel under a pressure substantially higher than engine cylinder pressure is fed into the injection and ignition device through fuel inlet 1. The fuel passes through fuel passage 2 and fuel port 3, around armature 23 and through the fuel passage grooves cut into injection valve 17. Fuel flow stops at the valve, which, in its non-activated position is resiliently urged against valve seat 9 by return spring 21, thereby providing a fluid tight seal between injection valve 17 and valve seat 9.

When electric pulses are fed to solenoid 5, armature 23 and injection valve 17, which is fixedly joined to the armature, are caused to lift off valve seat 9 and against the spring action of the return spring.

Stroke limiter 19 provides for substantially constant valve travel.

Injection valve 17 thereby opens and stays open for the duration of the electric pulse, permitting the fuel to flow into fuel discharge cavity 10. At least one main fuel jet 26 forms as part of the fuel flows out of the fuel discharge cavity through main injection ports 15. At least one pilot fuel jet 27 forms as the remainder of the fuel in the discharge cavity flows out through pilot injection port 15.

Since the total discharge area of the main injection ports is substantially greater than the total discharge area of the pilot injection ports, most of the fuel is injected into the combustion chamber of the engine, while a lesser fraction of the fuel is injected, through the pilot injection ports, into the volume defined by combustion shell 11.

When injection begins, the combustion chamber contains only air, which was drawn therein during the preceding induction stroke.

The fuel flow rate through the main injection ports is controlled such as to form a lean air-fuel mixture between the air present in the combustion chamber and the injected fuel.

Conversely, the fuel flow rate through the pilot injection ports is controlled such as to form a rich, or a stoichiometric, mixture inside the combustion shell. This mixture is easy to ignite with an electric spark.

When a substantially high voltage is applied to first electrode 8, an electric spark forms between first electrode 8 and second electrode 13, thereby causing the fuel trapped in the volume defined by the combustion shell to ignite. As the fuel burns inside the combustion shell, the pressure therein rises and a plurality of combustion flames 28 are ejected through torch nozzles 14, into the combustion chamber. Thus torch ignition of the lean mixture present in the combustion chamber occurs, permitting the engine to run on an overall leaner mixture than a homogenous charge spark ignition engine.

Figure 3:
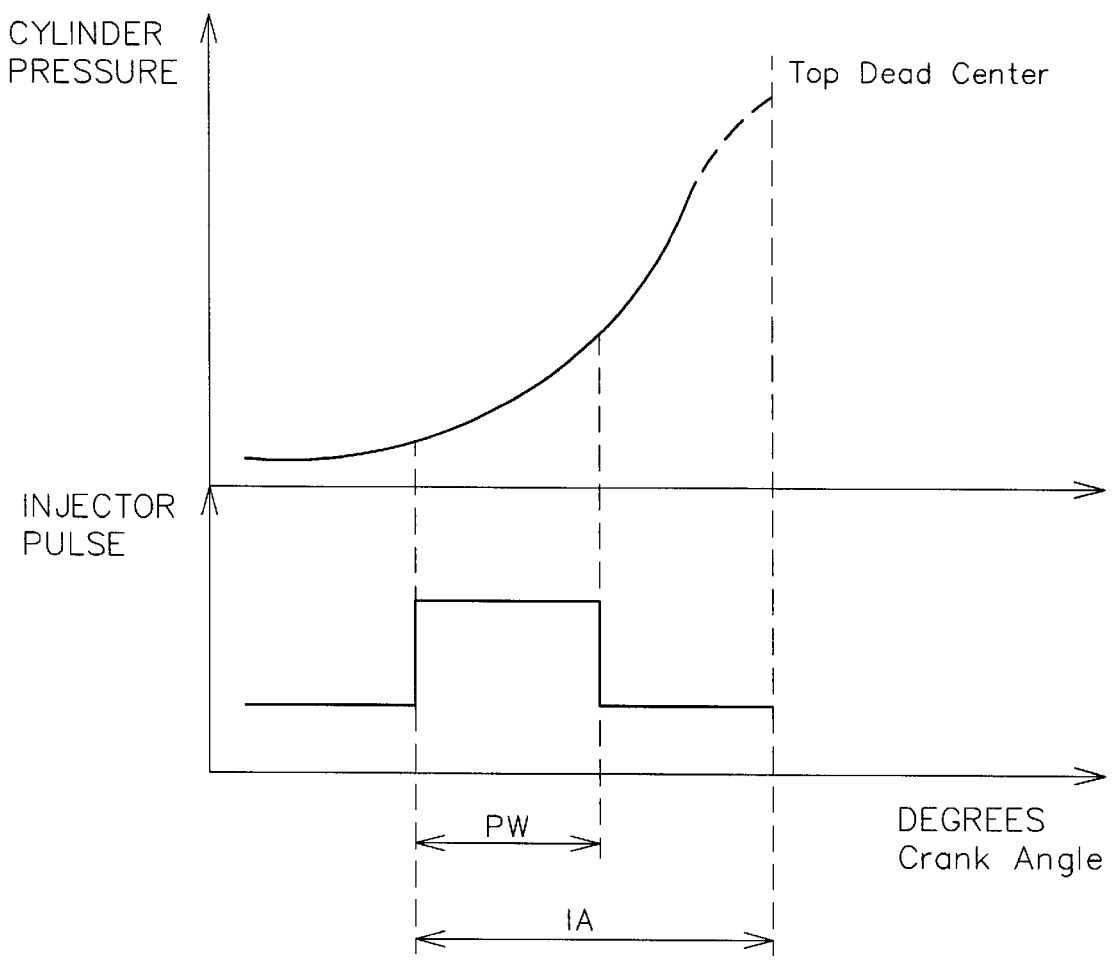
FIG. 3 shows the injection and ignition device control pulse waveform, superimposed over the pressure rise curve, during the compression stroke of the engine.

As illustrated by FIG. 3, the injection and ignition device of the invention takes advantage of the varying compression pressure to control fuel jet penetration and flow rate. Indeed, the injection occurs during the engine compression stroke, while the pressure inside the cylinder increases.

FIG. 3 shows the electric pulse waveform, and the compression pressure curve, versus degrees crank angle. The two parameters which define the injection process are the Injection Advance, henceforth referred to as IA and the duration of the electric signal applied to the solenoid, or Pulse Width, henceforth referred to as PW.

As revealed by the diagram in FIG. 3, the fuel control strategy relies on cylinder pressure as an input and the controller manipulates IA and PW to control the amount of fuel injected and the jet penetration into the combustion chamber. As cylinder pressure rises, jet penetration decreases, which contributes to the formation of the stratified charge.

Conclusion, Ramifications and Scope

Thus the reader will see that the injection and ignition device of the invention provides a simple yet effective stratified charge, torch ignition solution.

While our description contains many specificities, these should not be considered as limitations on the scope of the invention, but rather as an exemplification of one preferred embodiment thereof. Many other variations are possible. For example:

A different embodiment of the injection and ignition device of the invention utilizes a plurality of electrodes, arranged in a circular pattern surrounding the fuel injection valve.

Another embodiment relies solely on the fuel control strategy described by FIG. 3 to achieve charge stratification, and no combustion shell is used.

Yet in another embodiment, the valve is hydraulically actuated, rather than electrically.

Accordingly, the scope of the invention should be determined not by the embodiment illustrated, but by the appended claims and their legal equivalents.

We claim:

1. A self-contained injection and ignition device for preparing and igniting a nonhomogeneous, stratified, air-fuel mixture inside a cylinder of an internal combustion engine, comprising:

(a) at least one injection valve, (b) said injection valve being fluidically connected to a source of combustible fuel at a pressure substantially higher than the pressure inside said cylinder of said internal combustion engine, (c) means, including a spring, for resiliently urging said injection valve to a closed position thereby preventing the flow of a fluid therethrough, (d) means for forcing said injection valve open for a predetermined time thereby allowing the flow of a predetermined quantity of said combustible fuel therethrough, (e) ignition means, for generating an electrical spark of sufficient energy for igniting said combustible fuel, (f) a combustion shell projecting into the combustion chamber of said cylinder such that a predetermined volume is delimited surrounding said injection valve and said ignition means, (g) at least one main injection port fluidically connected to said injection valve at a first end and to a region of the engine cylinder outside said combustion shell, at a second end opposite to said first end, (h) at least one pilot injection port of substantially smaller area than said main injection port and wherein said pilot injection port is fluidically connected to said injection valve at a first end and to the interior volume of said combustion shell, at a second end opposite to said first end, (i) whereby a predetermined fuel dose is divided into a main fuel dose and a pilot fuel dose, and whereby said pilot fuel dose is injected into said predetermined volume inside said combustion shell and said main fuel dose is injected into the combustion chamber space outside of the shell and said main fuel dose is injected into the combustion chamber space outside of the shell, at a predetermined moment in time, thereby effectively allowing for a rich air-fuel mixture kernel to form inside the shell and for a lean air-fuel mixture field to form outside the same, and whereby said ignition means ignites rich air-fuel mixture kernel at a predetermined moment in time.

2. The combustion shell of claim 1, further including at least one flame ejection nozzle cut through the wall of said combustion shell such that when said pilot fuel dose is ignited inside said combustion shell, a least one combustion flame will be ejected therethough, thereby promoting torch ignition of said lean air-fuel mixture field in the space outside of said combustion shell.

* * * * *